US012759401B2

(12) United States Patent
Yusa et al.

(10) Patent No.: US 12,759,401 B2
(45) Date of Patent: Oct. 13, 2026

(54) DISPLAY CONTROL DEVICE, DISPLAY CONTROL METHOD, AND STORAGE MEDIUM

(71) Applicant: Panasonic Automotive Systems Co., Ltd., Kanagawa (JP)

(72) Inventors: Junya Yusa, Kanagawa (JP); Kazuki Kuzu, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 17 days.

(21) Appl. No.: 18/980,658

(22) Filed: Dec. 13, 2024

(65) Prior Publication Data

US 2025/0108692 A1 Apr. 3, 2025

Related U.S. Application Data

(63) Continuation of application No. PCT/JP2023/018855, filed on May 22, 2023.

(30) Foreign Application Priority Data

Jun. 30, 2022 (JP) ................................ 2022-105767

(51) Int. Cl.
*B60K 35/81* (2024.01)

(52) U.S. Cl.
CPC ........ *B60K 35/81* (2024.01); *B60K 2360/182* (2024.01)

(58) Field of Classification Search
CPC . B60K 35/81; B60K 2360/182; G06F 3/0484; G09G 5/00; G09G 5/37; G09G 5/38; H04N 7/18
See application file for complete search history.

(56) References Cited

U.S. PATENT DOCUMENTS

2011/0234574 A1* 9/2011 Tanaka ................. G09G 3/2096 345/211
2012/0084676 A1* 4/2012 de Paz .................. G06F 1/1641 715/761

(Continued)

FOREIGN PATENT DOCUMENTS

JP 2010-107933 5/2010
JP 2013-114049 6/2013

(Continued)

OTHER PUBLICATIONS

Japanese Office Action dated May 7, 2025 issued in Japanese Patent Application No. 2022-105767, along with an English translation.

(Continued)

*Primary Examiner* — Omeed Alizada
(74) *Attorney, Agent, or Firm* — Greenblum & Bernstein, P.L.C.

(57) ABSTRACT

A display control device includes: an acquirer that acquires failure region information indicating a failure region in a display region constructed on one or more display screens that display an image; and a controller that identifies, based on the failure region information acquired by the acquirer, a displayable region obtained by omitting the failure region from the display region, reconstructs the displayable region to display the image in the displayable region identified, and outputs the displayable region reconstructed.

9 Claims, 10 Drawing Sheets

(56) References Cited

U.S. PATENT DOCUMENTS

| | | | | |
|---|---|---|---|---|
| 2016/0307544 | A1* | 10/2016 | Lin | G09G 5/373 |
| 2017/0269407 | A1* | 9/2017 | Jiang | G02F 1/1309 |
| 2022/0317837 | A1 | 10/2022 | Nasu et al. | |

FOREIGN PATENT DOCUMENTS

| | | |
|---|---|---|
| JP | 2017-121841 | 7/2017 |
| JP | 7345144 | 9/2023 |

OTHER PUBLICATIONS

International Search Report issued in International Pat. Appl. No. PCT/JP2023/018855, dated Jul. 11, 2023, along with an English translation thereof.

Office Action dated Jul. 22, 2025 issued in Japanese Patent Application No. 2022-105767 along with an English translation.

* cited by examiner

DISPLAY CONTROL DEVICE, DISPLAY CONTROL METHOD, AND STORAGE MEDIUM

CROSS REFERENCE TO RELATED APPLICATIONS

This is a continuation application of PCT International Application No. PCT/JP2023/018855 filed on May 22, 2023, designating the United States of America, which is based on and claims priority of Japanese Patent Application No. 2022-105767 filed on Jun. 30, 2022.

FIELD

The present disclosure relates to a display control device, a display control method, and a storage medium.

BACKGROUND

Patent Literature (PTL) 1 discloses a display device for a vehicle which displays various types of information related to the vehicle. This display device has a predetermined priority order of importance for different images, and includes a detector which detects the occurrence of a failure in each of a plurality of displays, and a controller which causes, based on a detection signal for the occurrence of the failure generated by the detector, displays that do not encounter a failure to display the images in descending order of importance.

CITATION LIST

Patent Literature

PTL 1: Japanese Unexamined Patent Application Publication No. 2017-121841

SUMMARY

However, the display device for a vehicle according to PTL 1 can be improved upon.

In view of this, the present disclosure provides a display control device and the like capable of improving upon the above related art.

A display control device according to an aspect of the present disclosure includes: an acquirer that acquires failure region information indicating a failure region in a display region constructed on one or more display screens that display an image; and a controller that: identifies, based on the failure region information acquired by the acquirer, a displayable region obtained by omitting the failure region from the display region; reconstructs the displayable region to display the image in the displayable region identified; and outputs the displayable region reconstructed.

The display control device and the like according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
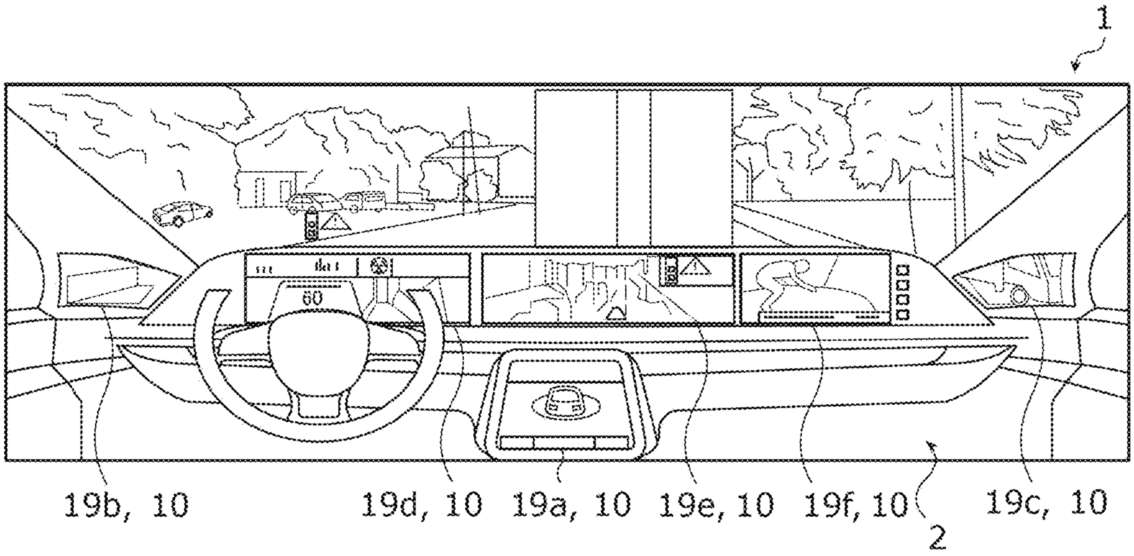
FIG. 1 is a schematic diagram showing a display system in an embodiment.

An embodiment described below shows a comprehensive or specific example. Thus, values, shapes, materials, constituent elements, the arrangements, the positions, and the connection of the constituent elements, steps, the order of the steps, and the like which are shown in the embodiment below are examples, and are not intended to limit the present disclosure. Among the constituent elements in the embodiment below, constituent elements which are not recited in the independent claims are described as arbitrary constituent elements.

The drawings each are schematic diagrams, and are not exactly shown. Hence, in the drawings, the same constituent members are identified with the same reference signs.

The embodiment will be specifically described below with reference to the drawings.

EMBODIMENT

Configuration and Function

Display system 1 in the present embodiment will first be described with reference to FIGS. 1 to 4.

Figure 2:
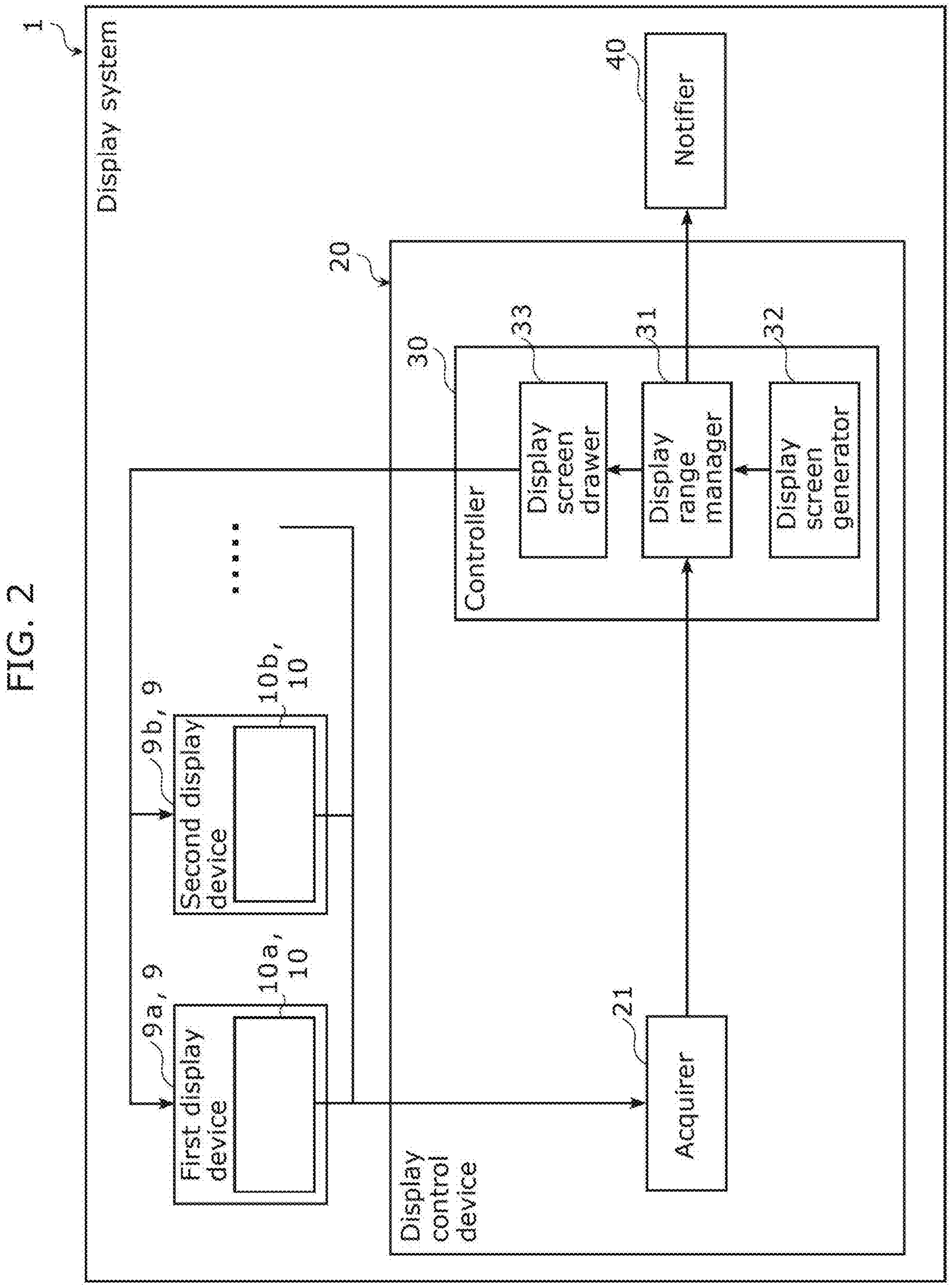
FIG. 2 is a block diagram showing the display system in the embodiment.
Figure 3A:
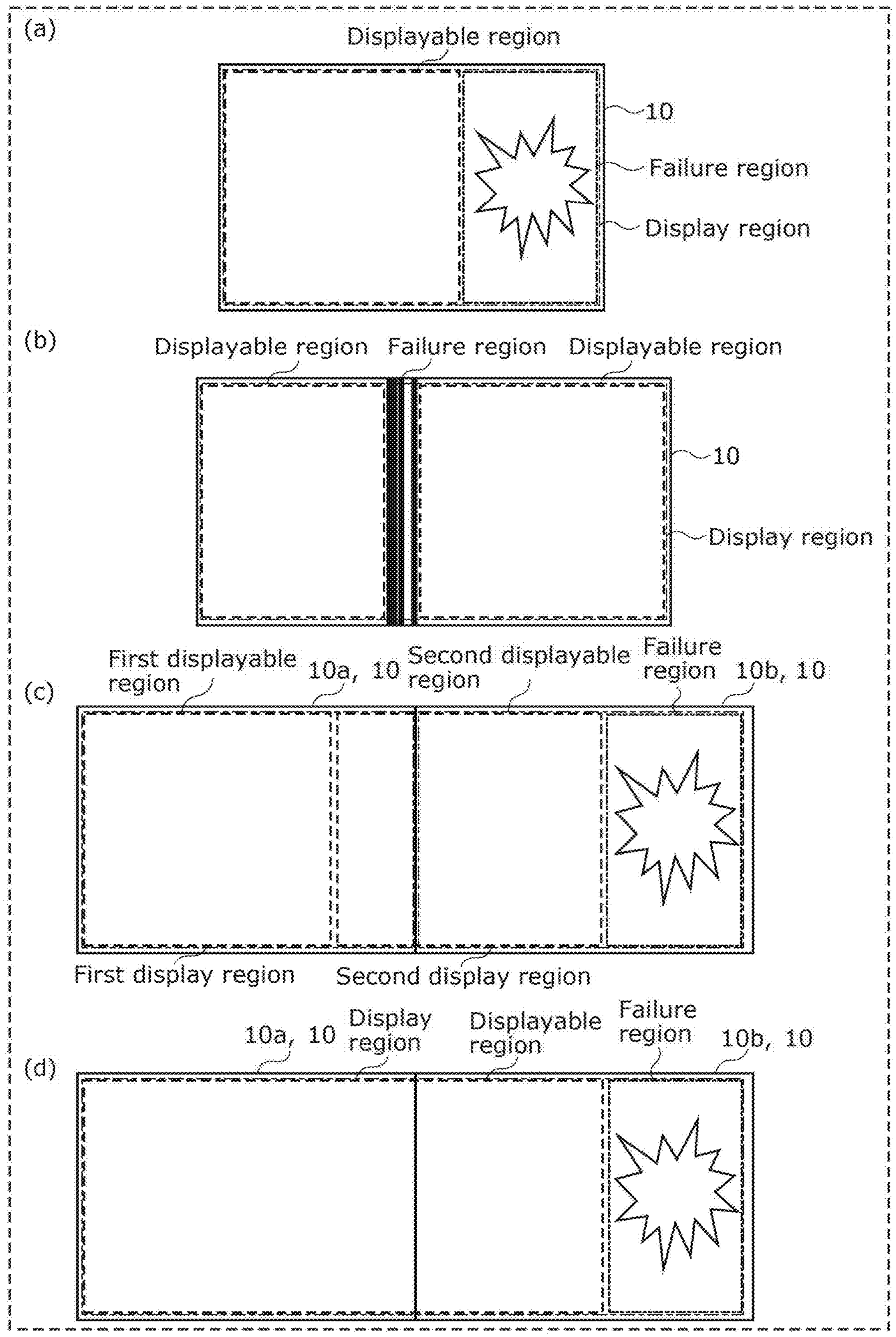
FIG. 3A is a schematic diagram showing a displayable region and a failure region on a display screen.
Figure 3B:
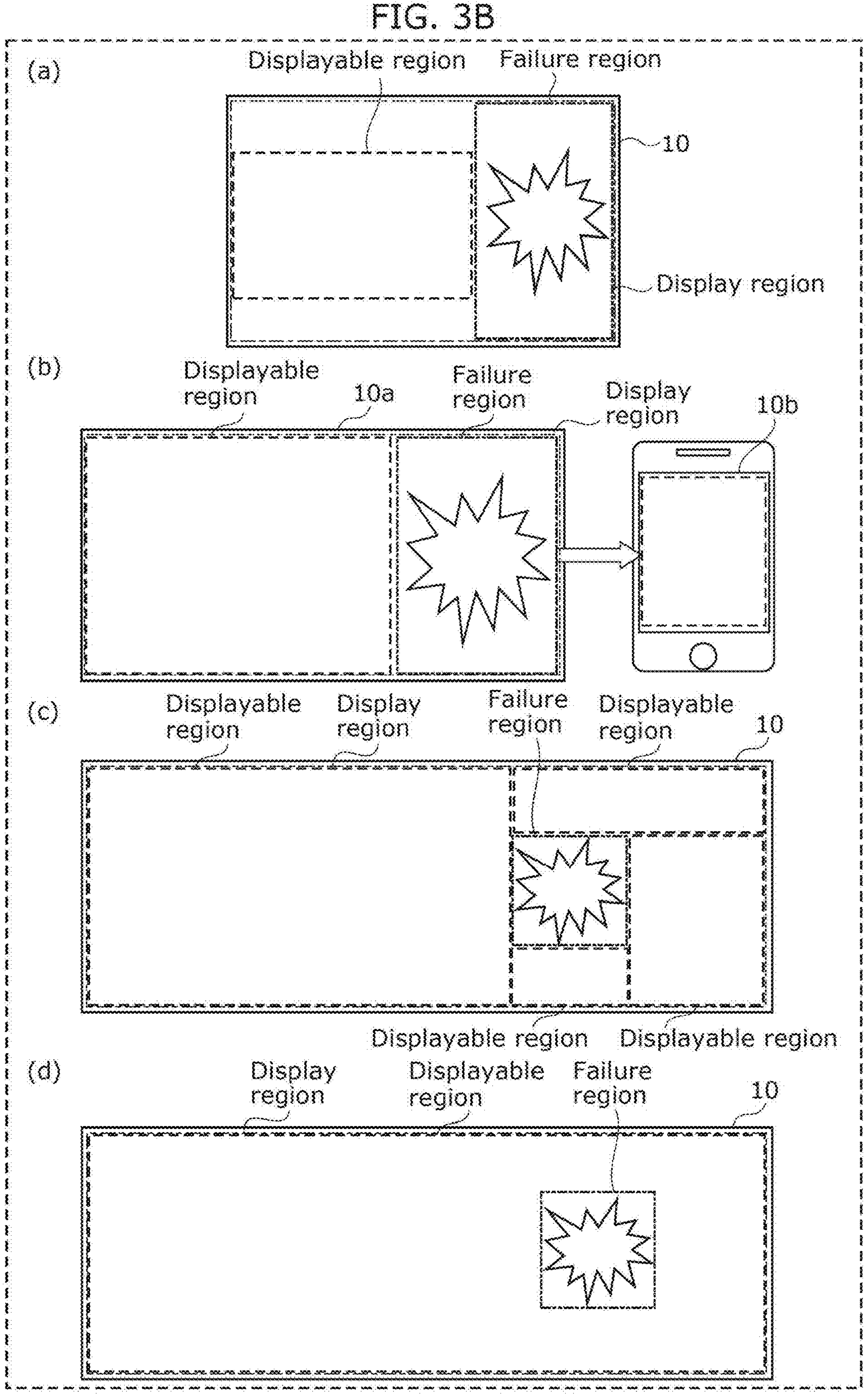
FIG. 3B is another schematic diagram showing the displayable region and the failure region on the display screen.
Figure 4:
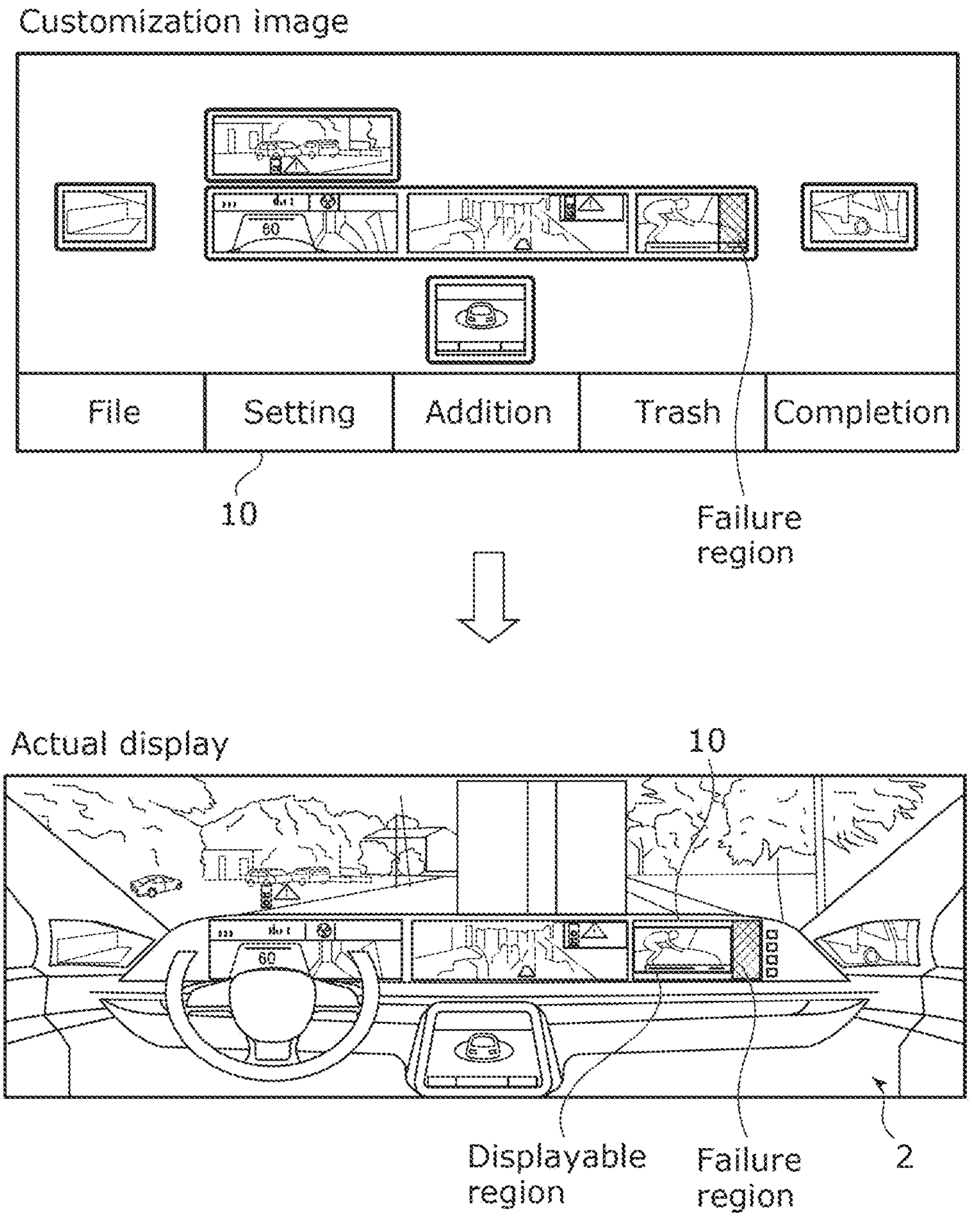
FIG. 4 is a diagram illustrating a state where a customization mode is performed and a customization operation is performed in the display system.

FIG. 1 is a schematic diagram showing display system 1 in the embodiment. FIG. 2 is a block diagram showing display system 1 in the embodiment. FIG. 3A is a schematic diagram showing a displayable region and a failure region on display screen 10. FIG. 3B is another schematic diagram showing the displayable region and the failure region on display screen 10. FIG. 4 is a diagram illustrating a state where a customization mode is performed and a customization operation is performed in display system 1.

As shown in FIG. 1, display system 1 is a system for displaying a plurality of images on display screens 10 of one or more display devices 9. Specifically, in display system 1, for display screens 10 of one or more display devices 9, the display positions of the images can be set automatically or manually by a user. In display system 1, when a part of display screens 10 fails, the images are displayed in regions other than the part which fails. For example, display system 1 is used in vehicle 2 or the like in which one or more display devices 9 are installed, even when a part of display screen 10 of certain display device 9 among one or more display devices 9 fails, one or more display devices 9 other than the part which fails are operated in conjunction with each other, and thus the images can be displayed.

In the present embodiment, the images are images which are displayed based on applications, and examples thereof include operation statuses of vehicle instruments and vehicle-mounted devices, navigation information, captured images, and information such as nearby vehicle information. Examples of the vehicle instrument include a speedometer, a direction indicator lamp, a warning lamp, an odometer, a shift position, a fuel gauge, a water temperature gauge, and the like. Examples of the vehicle-mounted device include an acoustic device, a vehicle-mounted lighting device, a seat device, and the like. The navigation information is, for example, information for providing a driver with a current position and route guidance to the destination when vehicle 2 is traveling. The captured images are images of the surrounding or the interior of vehicle 2 captured by an imaging device installed in vehicle 2. The nearby vehicle information is information which indicates whether other vehicles are present around vehicle 2, the number of the vehicles, the speeds of the vehicles, distances from vehicle 2 to the other vehicles, and the like.

Specifically, as shown in FIG. 2, display system 1 includes one or more display devices 9, display control device 20, and notifier 40.

Display Device 9

One or more display devices 9 are displays such as a personal computer (PC) monitor like a liquid crystal display, a car navigation system installed in vehicle 2, an electronic mirror system, a multi-information display, and a head up display (HUD).

FIG. 1 illustrates, as a plurality of display devices 9, car navigation system 19*a* which is disposed in a central part of a vehicle width, an electronic mirror system which functions as left side mirror 19*b* and right side mirror 19*c*, and a plurality of multi-information displays 19*d*, 19*e*, and 19*f*. These display devices 9 are arranged side by side such that the passenger of vehicle 2 can view display devices 9 at the same time.

When a plurality of display devices 9 are provided in vehicle 2, two or more display devices 9 of the plurality of display devices 9 are controlled in conjunction with each other by display system 1, and thus they can display a single image or they each can individually display an image. Two or more display devices 9 are arranged next to each other or are adjacent to each other. In FIG. 2 in the present embodiment, two or more display devices 9 include first display device 9*a* and second display device 9*b*. First display device 9*a* differs from second display device 9*b* in at least one of the model, the performance (such as the resolution, the response speed, or the contrast ratio), the size of display screen 10, or the setting. Although two or more display devices 9 differ from each other in at least one of the physical size, the resolution, the brightness, or the color tone, they are controlled in conjunction with each other by the display control device, and thus they display a consistent overall image.

Display Control Device 20

As shown in FIG. 2, display control device 20 performs control such that a plurality of images are displayed on display screens 10 of one or more display devices 9. Specifically, display control device 20 can perform control such that when a part of display screens 10 fails, the images are displayed in a displayable region other than a failure region.

Here, the failure region is a region where the images cannot be appropriately displayed on display screens 10 of one or more display devices 9. The displayable region is a region other than the failure region on display screens 10 of one or more display devices 9, and is a region where the images can be appropriately displayed. The failure region and the displayable region are identified by positional coordinates on display screens 10.

Specifically, display control device 20 includes acquirer 21 and controller 30.

Acquirer 21 acquires failure region information indicating the failure region in a display region in FIG. 3A constructed on one or more display screens 10 which display the images. For example, acquirer 21 is an input interface or the like. Here, the display region is a region where the images can be displayed on one or more display screens 10 of one or more display devices 9, and includes the entire region on one or more display screens 10 which do not fail and the displayable region which has been subjected to reconstruction to be described later.

When acquirer 21 is a sensor, the sensor detects the failure region on one or more display screens 10 of one or more display devices 9 to be able to acquire the failure region information. In this case, the sensor is a camera sensor or the like, and may include, for example, a detector and a failure range detector. The detector may image one or more display screens 10 to detect one or more display screens 10. The failure range detector may detect, as the failure region, a region where the images are not displayed on one or more display screens 10 which have been detected.

When acquirer 21 is the input interface, an external device identifies the failure region, and thus the input interface can acquire the failure region information indicating the failure region. The external device is, for example, an input terminal such as a smart phone or a tablet terminal which can acquire the failure region information as a result of the failure region being input by the user.

Then, acquirer 21 can output the acquired failure region information to controller 30.

Controller 30 can identify, based on the failure region information acquired from acquirer 21, the displayable region obtained by omitting the failure region from the display region.

Specifically, controller 30 includes display range manager 31, display screen generator 32, and display screen drawer 33. In this case, controller 30 may include at least display range manager 31.

Display range manager 31 manages a display range based on the failure region information acquired from acquirer 21. Specifically, display range manager 31 identifies the displayable region obtained by omitting the failure region from the display region. Here, display range manager 31 defines the failure region by surrounding the entire failure region with a predetermined frame which stores the entire failure region. The predetermined frame is, for example, circular, square, or polygonal. Display range manager 31 manages the display range by reconstructing the displayable region such that the images are displayed in the identified displayable region. In other words, display range manager 31 reconstructs the displayable region from the display region such that the images are displayed in only the displayable region. Display range manager 31 outputs the reconstructed displayable region to display screen drawer 33 and notifier 40. Display range manager 31 may be an example of a controller.

Here, as shown in part (a) in FIG. 3A, the displayable region is a region where the images can be displayed in the display region constructed on display screen 10 of display device 9, and is a region obtained by omitting the failure region. The failure region is a region where the images cannot be appropriately displayed due to a failure in the region in which the images are to be displayed on display screen 10 of display device 9.

A displayable region as described below may be reconstructed.

Display range manager 31 may first divide the identified displayable region into a plurality of displayable regions, reconstruct the displayable regions to display the images, and output the displayable regions which are obtained by the division and have been reconstructed. For example, it is likely that as shown in part (b) in FIG. 3A, the display region is divided due to a failure in a part of display screen 10. In this case, it is necessary to reconstruct a plurality of displayable regions according to the display regions formed by the division. In other words, display range manager 31 performs the reconstruction such that the images are displayed in the displayable regions divided by omitting the failure region from the display region. The example in part (b) in FIG. 3A shows the two independent displayable regions reconstructed by dividing the identified displayable region. In this case, different images can be independently displayed in the two displayable regions.

When as shown in part (c) in FIG. 3A, first display screen 10*a* and second display screen 10*b* among two or more display screens 10 are arranged side by side, display range manager 31 may identify a first displayable region obtained by omitting the failure region from a first display region on first display screen 10*a* and a second displayable region obtained by omitting the failure region from a second display region on second display screen 10*b*, perform reconstruction to display the images in the first displayable region and the second displayable region which have been identified, and output the first displayable region and the second displayable region which have been subjected to the reconstruction. For example, when first display screen 10*a* and second display screen 10*b* are provided side by side so as to be continuous, if the failure region is formed in at least one of first display screen 10*a* or second display screen 10*b*, display range manager 31 identifies the first displayable region and the second displayable region obtained by omitting the failure region from the first display region and the second display region. Then, display range manager 31 reconstructs the first displayable region and the second displayable region which have been identified.

In the example in part (c) in FIG. 3A, the failure region is formed in second display screen 10*b*. In this case, display range manager 31 reconstructs a part of the first display region according to the size of the failure region on second display screen 10*b* to form the first displayable region, and reconstructs a region where the remaining display region of the first display region and the displayable region obtained by omitting the failure region from the second display region are combined to form the second display region. Although in this case, different images can be independently displayed in the two displayable regions, in the second displayable region, the images are displayed to straddle first display screen 10*a* and second display screen 10*b*.

When as shown in part (d) in FIG. 3A, first display screen 10*a* and second display screen 10*b* among two or more display screens 10 are arranged side by side, display range manager 31 may identify one displayable region obtained by omitting the failure region from one display region that is a combination of a first display region on first display screen 10*a* and a second display region on second display screen 10*b*, perform reconstruction to display the images in the identified one displayable region, and output the one displayable region subjected to the reconstruction. For example, when first display screen 10*a* and second display screen 10*b* are provided side by side so as to be continuous, if the failure region is formed in at least one of first display screen 10*a* or second display screen 10*b*, display range manager 31 identifies the one displayable region obtained by omitting the failure region from the one display region that is a combination of the first display region and the second display region. Display range manager 31 reconstructs the identified one displayable region. In the example in part (d) in FIG. 3A, the failure region is formed in second display screen 10*b*, and thus display range manager 31 combines the first display region and the displayable region obtained by omitting the failure region from the second display region to form the one displayable region. In this case, the images are displayed in the one displayable region, that is, are displayed to straddle first display screen 10*a* and second display screen 10*b*.

As shown in part (a) in FIG. 3B, display range manager 31 may reconstruct the identified displayable region while maintaining an aspect ratio. When a region obtained by omitting the failure region from the display region is a displayable region, the aspect ratio of the displayable region differs from the aspect ratio of the display region, and thus the images displayed in the displayable region are extended or contracted in a predetermined direction. Hence, display range manager 31 may reconstruct the displayable region while maintaining the aspect ratio of the display region before the reconstruction.

When as shown in part (b) in FIG. 3B, first display screen 10*a* and second display screen 10*b* among two or more display screens 10 are arranged, display range manager 31 identifies, based on failure region information of first display screen 10*a*, a first displayable region obtained by omitting the failure region from a first display region on first display screen 10*a*. Display range manager 31 divides the first display region into the identified first displayable region and the failure region, performs reconstruction, outputs, from first display screen 10*a*, an image corresponding to the first displayable region subjected to the reconstruction, and outputs, from a second display region on second display screen 10*b* subjected to the reconstruction, an image corresponding to the failure region. For example, when a part of first display screen 10*a* fails, a part of an image corresponding to the first displayable region obtained by omitting the failure region is displayed, and the remaining part of the image corresponding to the failure region is displayed in the second display region on second display screen 10*b*. In this way, first display screen 10*a* and second display screen 10*b* are arranged side by side, and thus an image which can be displayed in the first display region when first display screen 10*a* does not fail can be displayed so as to be reproduced.

As shown in part (d) in FIG. 3B, display range manager 31 may identify, based on the failure region information acquired from acquirer 21, a displayable region obtained by omitting only the failure region from the display region. For example, display range manager 31 may perform reconstruction to use, as one displayable region, all parts of the display region other than the failure region. In another example, as shown in part (c) in FIG. 3B, display range manager 31 may divide the displayable region identified in the display region into a plurality of displayable regions, and perform reconstruction. In other words, display range manager 31 may perform reconstruction to use, as displayable regions, all parts of the display region other than the failure region.

As shown in FIG. 2, display screen generator 32 generates a drawing command for using the operation of an application to cause display screen drawer 33 to perform drawing processing. Display screen generator 32 outputs the generated drawing command to display screen drawer 33 via display range manager 31.

Display screen drawer 33 acquires the drawing command for drawing an image of the application or the like generated by display screen generator 32. Display screen drawer 33 performs, based on the drawing command acquired from display screen generator 32 via display range manager 31 and the reconstructed displayable region acquired from display range manager 31, the drawing processing in which the brightness (lightness), the contrast, the gamma value, the color tone, and the like of an image displayed in the displayable region are adjusted. Then, display screen drawer 33 outputs an image obtained by performing the drawing processing to display device 9 such that the image is displayed in the reconstructed displayable region.

In this way, even when the failure region is formed in display screen 10, in display control device 20, the image can be displayed in the displayable region which is obtained by omitting the failure region from the display region and has been subjected to reconstruction.

Notifier 40

Notifier 40 is, for example, a communication interface which is connected to a network to be able to communicate therewith, a display monitor which can display an image, a speaker which can output sound, or the like. When notifier 40 acquires the reconstructed displayable region from display range manager 31, notifier 40 outputs information indicating that the failure region is present and the display region in display device 9 is to be changed.

Customization of Display Screen 10

In the present embodiment, when display screen 10 fails, display system 1 performs a customization mode to be able to appropriately set images which are displayed in a plurality of display devices 9. A configuration may be adopted in which even when display screen 10 does not fail, the customization mode can be performed. When display system 1 performs the customization mode, as shown in FIG. 4, a customized image is displayed in a part of display devices 9. The user can customize, according to the preferences, part images, the arrangement positions, the sizes, the display formats thereof, and the like for executing applications on the customization image. The applications are associated with, for example, part images related to vehicle instruments for a vehicle speed display, an engine rotation speed, and the like, part images related to the operation statuses of vehicle-mounted devices for the volume of an audio device and the like, part images related to navigation information, and the like. The details of the display which are customized by the user can be displayed on display screens 10 of display devices 9 provided in vehicle 2. Here, when a part of display screen 10 fails, controller 30 displays an image obtained by performing the drawing processing on the reconstructed displayable region as in the actual display shown in FIG. 4.

Processing Operation

Display control device 20, a display control method, and a processing operation caused by programs in the present embodiment will be described.

Operation Example 1

A case where a part of one display screen 10 fails will first be described with reference to FIG. 5.

Figure 5:
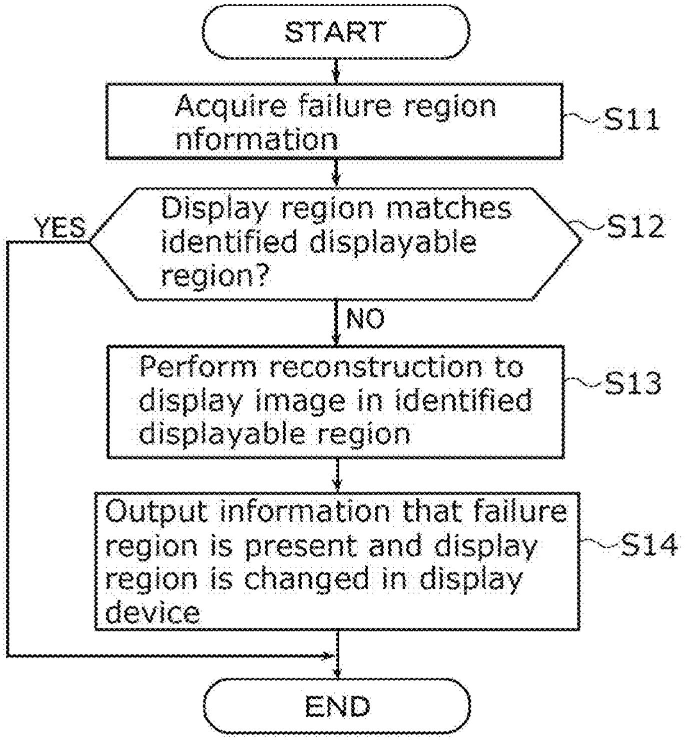
FIG. 5 is a flowchart showing Operation Example 1 of the display system in the embodiment.

FIG. 5 is a flowchart showing Operation Example 1 of display system 1 in the embodiment.

Acquirer 21 first acquires failure region information which indicates a failure region in a display region constructed on one or more display screens 10 that display an image (S11). Acquirer 21 outputs the acquired failure region information to controller 30.

Then, display range manager 31 of controller 30 identifies, based on the failure region information acquired from acquirer 21, a displayable region obtained by omitting the failure region from the display region. Display range manager 31 determines whether the display region matches the identified displayable region (S12). When display range manager 31 determines that the display region matches the identified displayable region (yes in S12), a processing operation in the flowchart is completed. Then, the processing returns to step S11 to repeat the operation processing.

On the other hand, when display range manager 31 determines that the display region does not match the identified displayable region (no in S12), display range manager 31 performs reconstruction such that an image is not displayed in the identified displayable region (S13). Display range manager 31 outputs the reconstructed displayable region to display screen drawer 33 and notifier 40. Display screen drawer 33 acquires a drawing command for drawing an image of an application or the like generated by display screen generator 32, and acquires the reconstructed displayable region from display range manager 31. Display screen drawer 33 performs, based on the drawing command generated by display screen generator 32 and the displayable region reconstructed by display range manager 31, drawing processing in which the brightness (lightness), the contrast, the gamma value, the color tone, and the like of an image displayed in the displayable region are adjusted. Display screen drawer 33 outputs an image obtained by performing the drawing processing to display device 9 such that the image is displayed in the reconstructed displayable region.

Then, when notifier 40 acquires the reconstructed displayable region from display range manager 31, notifier 40 outputs information indicating that the failure region is present and the display region in display device 9 is to be changed (S14). In this way, for example, the user can take a measure such as repairing or replacing display device 9 or can continue to use display device 9 as it is.

Then, display system 1 completes the processing operation in the flowchart shown in FIG. 5. Then, the processing returns to step S11 to repeat the operation processing.

When a failure occurs in the reconstructed displayable region, display control device 20 uses the reconstructed displayable region as a display region, and can further construct a displayable region obtained by omitting the failure region.

Instead of determining, in step S12, by display range manager 31, whether the display region matches the identified displayable region, display range manager 31 may determine whether the failure region information has been acquired. When display range manager 31 determines that the failure region information has been acquired, the processing may proceed to step S13, and when display range manager 31 determines that the failure region information has not been acquired, the flowchart may be completed.

Operation Example 2

An operation example in which the identified displayable region is divided into a plurality of displayable regions will then be described with reference to FIG. 6.

Figure 6:
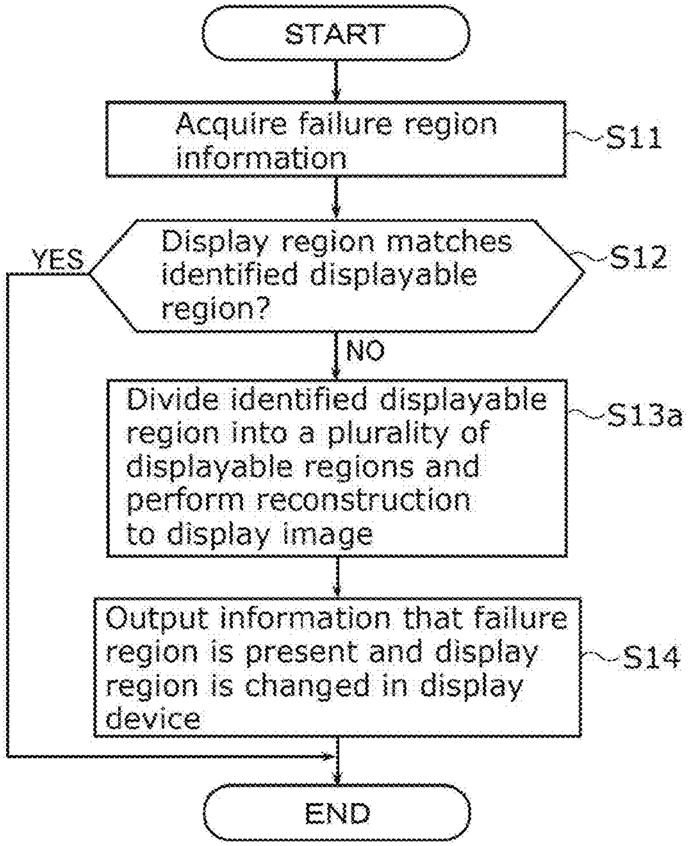
FIG. 6 is a flowchart showing Operation Example 2 of the display system in the embodiment.

FIG. 6 is a flowchart showing Operation Example 2 of display system 1 in the embodiment.

The same processing steps as in FIG. 5 are identified with the same symbols, and the description thereof is omitted as necessary.

First, when steps S11 and S12 are performed, and then the determination in step S12 is no, display screen drawer 33 divides the identified displayable region into a plurality of displayable regions, and reconstruction is performed such that images are displayed (S13*a*). Display screen drawer 33 acquires the drawing command from display screen generator 32 and the reconstructed displayable regions from display range manager 31. Display screen drawer 33 performs, based on the drawing generated by display screen generator 32 and the displayable regions reconstructed by display range manager 31, drawing processing on a plurality of images which are displayed in the displayable regions. Display screen drawer 33 outputs, to display device 9, the images on which the drawing processing has been performed such that the images respectively correspond to the reconstructed displayable regions.

Then, display system 1 performs step S14, and then completes the processing operation in the flowchart shown in FIG. 6. Then, the processing returns to step S11 to repeat the operation processing.

Operation Example 3

An operation example in which first display screen 10*a* and second display screen 10*b* are arranged side by side as an example of a plurality of display screens 10, and a failure region is omitted from a first display region on first display screen 10*a* and a second display region on second display screen 10*b* will then be described with reference to FIG. 7.

Figure 7:
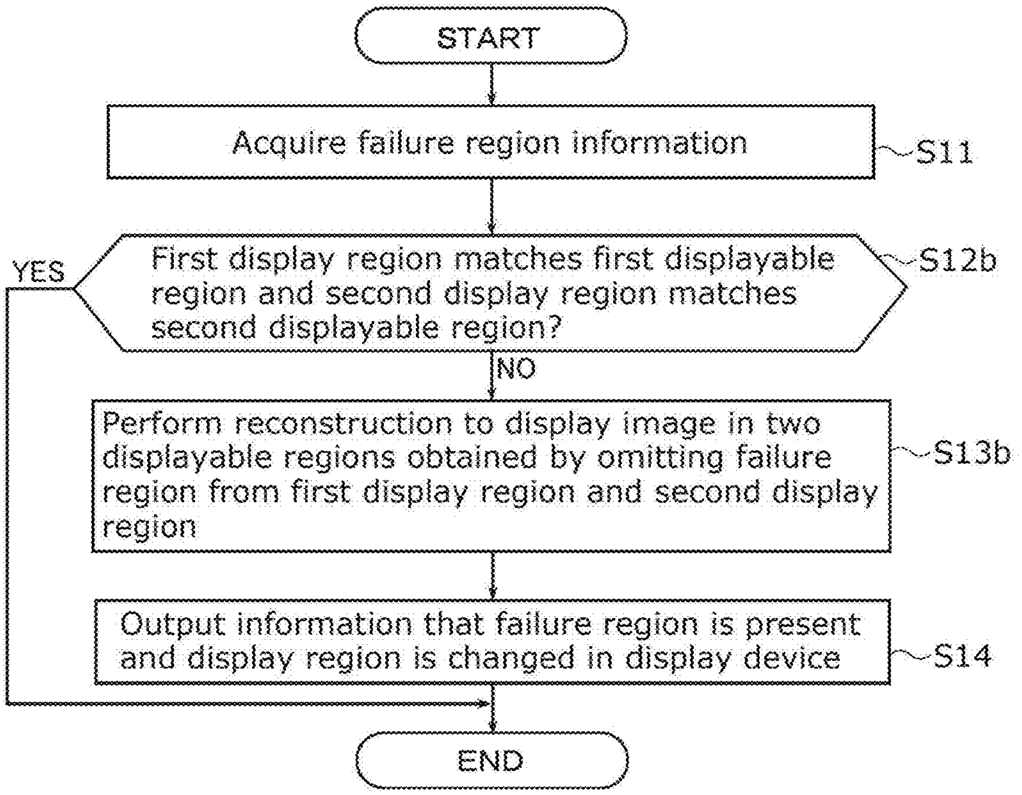
FIG. 7 is a flowchart showing Operation Example 3 of the display system in the embodiment.

FIG. 7 is a flowchart showing Operation Example 3 of display system 1 in the embodiment.

The same processing steps as in FIG. 5 are identified with the same symbols, and the description thereof is omitted as necessary.

Acquirer 21 first acquires failure region information from first display screen 10*a* and/or second display screen 10*b* which display different images (S11). Acquirer 21 outputs the acquired failure region information to controller 30.

Then, display range manager 31 of controller 30 identifies, based on the failure region information acquired from acquirer 21, a first displayable region obtained by omitting a failure region from a first display region on first display screen 10*a* and a second displayable region obtained by omitting the failure region from a second display region on second display screen 10*b*. For example, when as shown in part (c) in FIG. 3A, the failure region is formed in second display screen 10*b*, display range manager 31 identifies, based on the failure region information, the first displayable region on first display screen 10*a* and the second displayable region obtained by omitting the failure region from the second display region on second display screen 10*b*. Display range manager 31 determines whether the display regions match the identified displayable regions. Specifically, display range manager 31 determines whether the first display region matches the identified first displayable region and whether the second display region matches the identified second displayable region (S12*b*).

When display range manager 31 determines that the display regions match the identified displayable regions, that is, when the first display region matches the identified first displayable region and the second display region matches the identified second displayable region (yes in S12*b*), display range manager 31 completes the flowchart. Then, the processing returns to step S11 to repeat the operation processing.

On the other hand, when display range manager 31 determines that the display regions do not match the identified displayable regions, display range manager 31 performs reconstruction such that images are displayed in the identified displayable regions. In other words, when the first display region does not match the identified first displayable region, and/or when the second display region does not match the identified second displayable region (no in S12*b*), display range manager 31 performs the reconstruction such that the images are displayed in the two displayable regions obtained by omitting the failure region from the first display region and the second display region (S13*b*). Specifically, when the determination in step S12*b* is no, display range manager 31 reconstructs, according to the size of the failure region on second display screen 10*b*, a part of the first display region to display the image, and performs reconstruction such that the image is displayed in a region that is a combination of the remaining display region of the first display region and the displayable region obtained by omitting the failure region from the second display region (S13*b*). Display range manager 31 reconstructs the part of the first display region to set the first displayable region, and performs the reconstruction by combining the remaining display region of the first display region and the displayable region obtained by omitting the failure region from the second display region to set the second displayable region. Display screen drawer 33 acquires a drawing command for drawing an image of an application or the like generated by display screen generator 32, and acquires the reconstructed first displayable region and the reconstructed second displayable region from display range manager 31. Display screen drawer 33 performs, based on the drawing command generated by display screen generator 32 and the first displayable region and the second displayable region reconstructed by display range manager 31, drawing processing on the images which are displayed in the reconstructed first displayable region and the reconstructed second displayable region. Display screen drawer 33 outputs the image on which the drawing processing has been performed to the reconstructed first displayable region, and outputs the image on which the drawing processing has been performed to the reconstructed second displayable region. In the case of part (c) in FIG. 3A, display screen drawer 33 outputs, to first display device 9*a*, the image obtained by performing the drawing processing on the constructed first displayable region and the part of the image obtained by performing the drawing processing on the reconstructed second displayable region such that the image and the part of the image are displayed. Display screen drawer 33 outputs, to second display device 9*b*, the remaining image obtained by performing the drawing processing on the reconstructed second displayable region such that the remaining image is displayed.

Then, display system 1 performs step S14, and then completes the processing operation in the flowchart shown in FIG. 7. Then, the processing returns to step S11 to repeat the operation processing.

Operation Example 4

An operation example in which first display screen 10*a* and second display screen 10*b* are arranged as an example of a plurality of display screens 10, and a failure region is omitted from one display region that is a combination of a first display region on first display screen 10*a* and a second display region on second display screen 10*b* will then be described with reference to FIG. 8.

Figure 8:
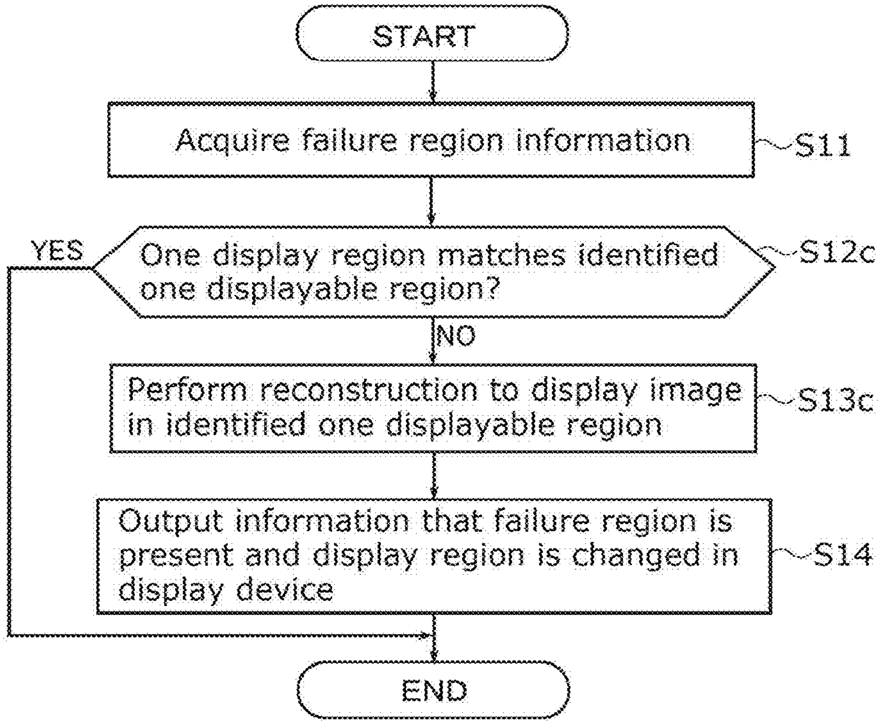
FIG. 8 is a flowchart showing Operation Example 4 of the display system in the embodiment.

FIG. 8 is a flowchart showing Operation Example 4 of display system 1 in the embodiment.

The same processing steps as in FIG. 5 are identified with the same symbols, and the description thereof is omitted as necessary.

Acquirer 21 first acquires failure region information from first display screen 10*a* and/or second display screen 10*b* (S11). Acquirer 21 outputs the acquired failure region information to controller 30.

Then, display range manager 31 of controller 30 identifies, based on the failure region information acquired from acquirer 21, one displayable region obtained by omitting the failure region from the one display region. For example, when as shown in part (d) in FIG. 3A, the failure region is formed in second display screen 10*b*, display range manager 31 identifies, based on the failure region information, the one displayable region that is a combination of the first display region and the displayable region obtained by omitting the failure region from the second display region. Display range manager 31 determines whether the one display region matches the identified one displayable region (S12*c*).

When display range manager 31 determines that the one display region matches the identified one displayable region (yes in S12*c*), display range manager 31 completes the flowchart. Then, the processing returns to step S11 to repeat the operation processing.

On the other hand, when display range manager 31 determines that the one display region does not match the identified one displayable region (no in S12*c*), display range manager 31 performs reconstruction such that an image is displayed in the identified one displayable region (S13*c*). Display screen drawer 33 acquires a drawing command for drawing an image of an application or the like generated by display screen generator 32, and acquires the reconstructed one displayable region from display range manager 31. Display screen drawer 33 performs, based on the drawing command generated by display screen generator 32 and the one displayable region reconstructed by display range manager 31, drawing processing on the image which is displayed in the reconstructed one displayable region. Display screen drawer 33 outputs, to first display device 9*a* and second display device 9*b*, the image obtained by performing the drawing processing on the reconstructed one displayable region.

Then, display system 1 performs step S14, and then completes the processing operation in the flowchart shown in FIG. 8. Then, the processing returns to step S11 to repeat the operation processing.

Operation Example 5

An operation example in which first display screen 10*a* and second display screen 10*b* are arranged, and an image corresponding to a failure region on first display screen 10*a* is output from a reconstructed second display region on second display screen 10*b* will then be described with reference to FIG. 9. Second display screen 10*b* is display screen 10 of a terminal device such as a tablet terminal or a smart phone which is separate and independent from first display screen 10*a*.

Figure 9:
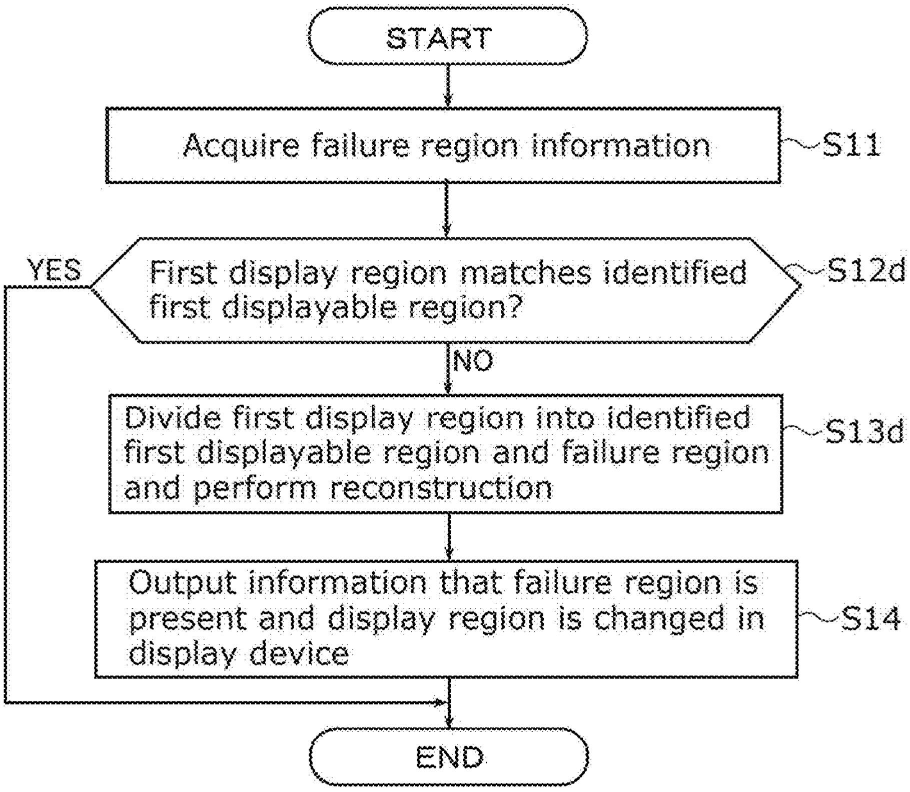
FIG. 9 is a flowchart showing Operation Example 5 of the display system in the embodiment.

FIG. 9 is a flowchart showing Operation Example 5 of display system 1 in the embodiment.

The same processing steps as in FIG. 5 are identified with the same symbols, and the description thereof is omitted as necessary.

Acquirer 21 first acquires failure region information from first display screen 10*a* which displays different images (S11). Acquirer 21 outputs the acquired failure region information to controller 30.

Then, display range manager 31 of controller 30 identifies, based on the failure region information acquired from acquirer 21, a first displayable region obtained by omitting the failure region from a first display region on first display screen 10*a*. Display range manager 31 determines whether the first display region matches the identified first displayable region (S12*d*).

When display range manager 31 determines that the first display region matches the identified first displayable region (yes in S12*d*), display range manager 31 completes the flowchart. Then, the processing returns to step S11 to repeat the operation processing.

On the other hand, when display range manager 31 determines that the first display region does not match the identified first displayable region (no in S12*d*), display range manager 31 divides the first display region into the identified first displayable region and the failure region, and performs reconstruction (S13*d*). In other words, display range manager 31 outputs the reconstructed first displayable region and a second display region on second display screen 10*b* reconstructed to correspond to the failure region. Display screen drawer 33 acquires a drawing command for drawing an image of an application or the like generated by display screen generator 32, and acquires the reconstructed first displayable region and the reconstructed second display region on second display screen 10*b* from display range manager 31. Display screen drawer 33 performs, based on the drawing command generated by display screen generator 32, the reconstructed first displayable region and the reconstructed second display region on second display screen 10*b*, drawing processing on a part of an image in the reconstructed first displayable region and on the remaining part of the image in the reconstructed second display region on second display screen 10*b*. In the case of part (b) in FIG. 3B, display screen drawer 33 outputs, to first display device 9*a*, the part of the image obtained by performing the drawing processing such that the part of the image is displayed in the reconstructed first displayable region, and outputs, to second display screen 10*b*, the remaining part of the image obtained by performing the drawing processing such that the remaining part of the image is displayed in the reconstructed second display region on the second display screen 10*b*.

Then, display system 1 performs step S14, and then completes the processing operation in the flowchart shown in FIG. 9. Then, the processing returns to step S11 to repeat the operation processing.

In steps S13, 13*a*, 13*b*, 13*c*, and 13*d* in Operation Examples 1 to 5 described above, display range manager 31 may further reconstruct the identified displayable region while maintaining the aspect ratio.

In steps S13, 13*a*, 13*b*, 13*c*, and 13*d* in Operation Examples 1 to 5 described above, display range manager 31 may identify, based on the failure region information acquired from acquirer 21, a displayable region obtained by omitting only the failure region from the display region, and reconstruct all the display regions other than the failure region as one displayable region.

Operational Effects

Operational effects of display control device 20, the display control method, and the programs in the present embodiment will then be described.

For example, disadvantageously, in the display device disclosed in PTL 1, when a partial failure occurs in a display, the partial failure is treated as a failure for the entire display surface of the display, and thus an image is not displayed on the display which has failed, with the result that the display region may be extremely narrowed to lower user experience (UX).

Hence, as described above, display control device 20 according to the present embodiment includes: acquirer 21 that acquires failure region information indicating a failure region in a display region constructed on one or more display screens 10 that display an image; and controller 30 that: identifies, based on the failure region information acquired by acquirer 21, a displayable region obtained by omitting the failure region from the display region; reconstructs the displayable region to display the image in the displayable region identified; and outputs the displayable region reconstructed.

Hence, even when a failure occurs in one display screen 10, the displayable region obtained by omitting the failure region from the display region on one or more display screens 10 can be reconstructed. In this way, the image can be displayed in the reconstructed displayable region, and thus a partial failure in one display screen 10 does not need to be treated as a failure for one display screen 10.

Therefore, in display control device 20, the extreme narrowing of the display region is suppressed, and thus it is possible to effectively utilize the displayable region other than the failure region.

The display control method according to the present embodiment includes: acquiring failure region information indicating a failure region in a display region constructed on one or more display screens 10 that display an image; identifying, based on the failure region information acquired, a displayable region obtained by omitting the failure region from the display region; reconstructing the displayable region to display the image in the displayable region identified; and outputting the displayable region reconstructed.

In the display control method described above, the same operational effects as described above are also achieved.

The programs in the present embodiment are programs for causing a computer to execute the display control method.

In the programs described above, the same operational effects as described above are also achieved.

In display control device 20 according to the present embodiment, controller 30: divides the displayable region identified into a plurality of displayable regions; subjects the plurality of displayable regions to the reconstructing; and outputs the plurality of displayable regions obtained by being divided and reconstructed.

In this way, as in part (b) in FIG. 3A, on one display screen 10, a plurality of displayable regions can be reconstructed and formed, and thus even when display screen 10 fails, a plurality of images can be displayed on one display screen 10.

Whatever position in display screen 10 fails, the displayable region is divided into a plurality of displayable regions, and thus the failure region can be minimized, with the result that it is possible to more effectively utilize the displayable region other than the failure region.

In display control device 20 according to the present embodiment, when first display screen 10*a* and second display screen 10*b* among two or more display screens 10 are arranged, controller 30: identifies a first displayable region obtained by omitting the failure region from a first display region on first display screen 10*a* and a second displayable region obtained by omitting the failure region from a second display region on second display screen 10*b*; performs the reconstructing to display the image in the first displayable region and the second displayable region that have been identified; and outputs the first displayable region and the second displayable region that have been subjected to the reconstructing.

In this way, when as in part (c) in FIG. 3A, first display screen 10*a* and second display screen 10*b* are arranged side by side, the first displayable region and the second displayable region which have been subjected to the reconstructing can be formed to straddle first display screen 10*a* and second display screen 10*b*. It is also possible to suppress a disadvantage in only the image on display screen 10 of first display screen 10*a* and second display screen 10*b* where the failure region is formed is displayed to be small. Hence, even when the failure region is formed, the images can be viewed over the entire reconstructed displayable regions in a well-balanced manner with respect to size.

In display control device 20 according to the present embodiment, when first display screen 10*a* and second display screen 10*b* among two or more display screens 10 are arranged, controller 30: identifies one displayable region obtained by omitting the failure region from one display region that is a combination of a first display region on first display screen 10*a* and a second display region on second display screen 10*b*; performs the reconstructing to display the image in the one displayable region identified; and outputs the one displayable region subjected to the reconstructing.

In this way, when as in part (d) in FIG. 3A, first display screen 10*a* and second display screen 10*b* are arranged side by side, even if the failure region is formed on one of first display screen 10*a* and second display screen 10*b*, one displayable region can be reconstructed.

In display control device 20 according to the present embodiment, controller 30 subjects the displayable region identified to the reconstructing while maintaining the aspect ratio before the reconstructing.

In this way, when as in part (a) in FIG. 3B, the displayable region with the aspect ratio maintained is reconstructed, and thus the extension and contraction of the image in a vertical direction or in a horizontal direction is suppressed.

In display control device 20 according to the present embodiment, when first display screen 10*a* and second display screen 10*b* among two or more display screens 10 are arranged, controller 30: identifies, based on the failure region information of first display screen 10*a*, a first displayable region obtained by omitting the failure region from a first display region on first display screen 10*a*; divides the first display region into the first displayable region and the failure region; performs the reconstructing; outputs, from first display screen 10*a*, an image corresponding to the first displayable region subjected to the reconstructing; and outputs, from a second display region on second display screen 10*b* subjected to the reconstructing, an image corresponding to the failure region.

In this way, when as in part (b) in FIG. 3B, the failure region is formed on first display screen 10*a*, the image corresponding to the failure region can be displayed on separate second display screen 10*b*. Hence, as the image in the first display region displayed before the failure, it is possible to combine and display the image corresponding to the reconstructed first displayable and region the image corresponding to the failure region.

In display control device 20 according to the present embodiment, controller 30 identifies, based on the failure region information acquired by acquirer 21, the displayable region obtained by omitting only the failure region from the display region.

In this way, when as in parts (c) and (d) in FIG. 3B, all the regions other than the failure region can be used as the displayable region, and thus it is possible to more effectively utilize the displayable region other than the failure region.

Variation 1 of Embodiment

The present variation differs from the embodiment in that when a failure region occupies a predetermined percentage or more of a display region, failure information indicating that display screen 10 fails is output. Unless otherwise specified, the other configurations in the present embodiment are the same as those in the embodiment, the same configurations are identified with the same symbols, and detailed description of the configurations is omitted.

Display system 1 in the present variation will first be described with reference to FIG. 10.

Figure 10:
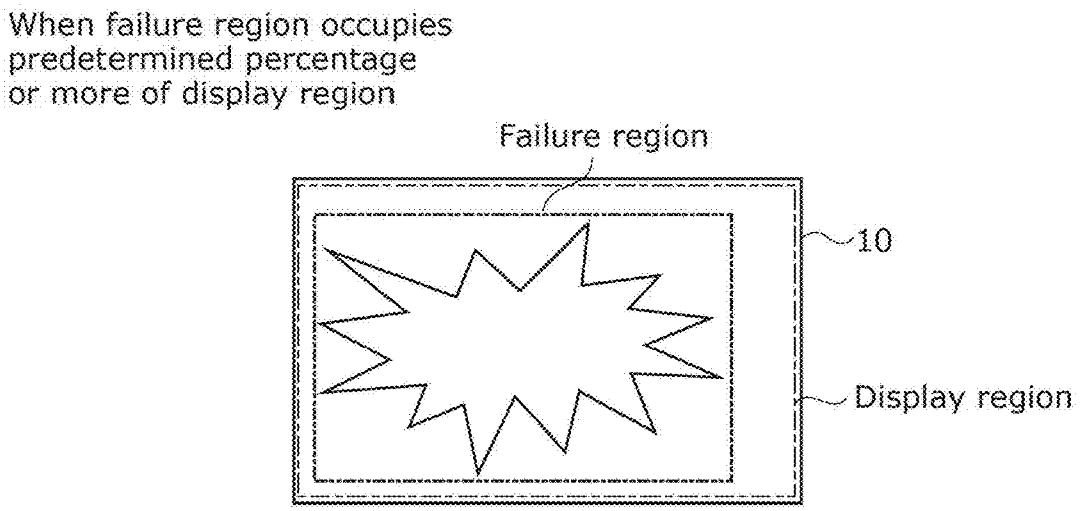
FIG. 10 is a schematic diagram showing a case where the failure region on the display screen occupies a predetermined percentage or more of a display region.

FIG. 10 is a schematic diagram showing a case where a failure region on display screen 10 occupies a predetermined percentage or more of a display region.

In the present variation, when the failure region indicated by failure region information acquired from acquirer 21 occupies the predetermined percentage or more of the display region, display range manager 31 may output failure information indicating that display screen 10 fails. For example, when the failure region is equal to or greater than the predetermined percentage of the display region, since a displayable region is small, it is likely that the user has difficulty in viewing an image which is displayed, and thus the user cannot recognize important information. Hence, when the failure region occupies the predetermined percentage or more of the display region, display range manager 31 may output the failure information to provide notification to units therearound.

In the variation as described above, a processing operation when the failure region occupies the predetermined percentage or more of the display region will be described with reference to FIG. 11.

Figure 11:
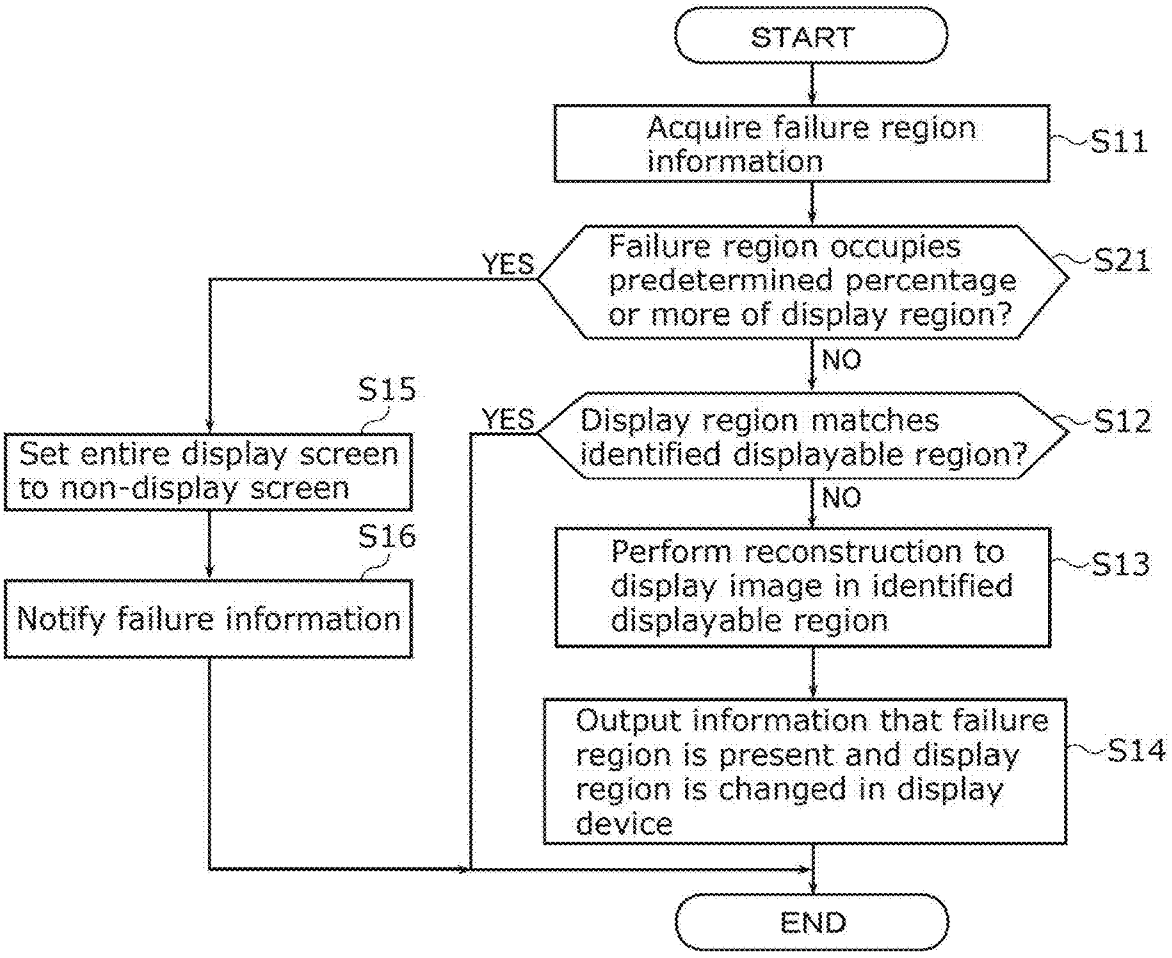
FIG. 11 is a flowchart showing the processing operation of a display system in Variation 1 of the embodiment.

FIG. 11 is a flowchart showing the processing operation of display system 1 in Variation 1 of the embodiment.

First, after step S11 is performed, display range manager 31 determines whether the failure region occupies the predetermined percentage or more of the display region (S21).

When display range manager 31 determines that the failure region occupies the predetermined percentage or more of the display region (yes in S21), display range manager 31 sets entire display screen 10 to a non-display screen (S15). Display range manager 31 outputs the failure information to notifier 40. In this way, notifier 40 notifies the failure information (S16), and thus the user can take a measure such as repairing or replacing display device 9. Then, the processing operation in the flowchart shown in FIG. 11 is completed, and the processing returns to step S11 to repeat the operation processing.

On the other hand, when display range manager 31 determines that the failure region does not occupy the predetermined percentage or more of the display region (no in S21), display range manager 31 performs steps S12 to S14, and then completes the processing operation in the flowchart shown in FIG. 11. Then, the processing returns to step S11 to repeat the operation processing.

In step S13 shown in FIG. 11 in the present variation, display range manager 31 may further reconstruct the identified displayable region while maintaining the aspect ratio.

In step S13 shown in FIG. 11 in the present variation, display range manager 31 may identify, based on the failure region information acquired from acquirer 21, the displayable region obtained by omitting only the failure region from the display region, and reconstruct all the display regions other than the failure region as one displayable region.

In display control device 20 according to the present variation as described above, when the failure region indicated by the failure region information acquired from acquirer 21 occupies the predetermined percentage or more of the display region, controller 30 outputs the failure information indicating that display screen 10 fails.

In this way, when the predetermined percentage or more is occupied, since the displayable region is excessively small, and the image which is displayed is also excessively small, the failure information is output, and thus it is possible to cause the user to consider replacement or repair.

Variation 2 of Embodiment

The present variation differs from the embodiment in that when a displayable region is smaller than a predetermined size, failure information is output. Unless otherwise specified, the other configurations in the present embodiment are the same as those in the embodiment, the same configurations are identified with the same symbols, and detailed description of the configurations is omitted.

Display system 1 in the present variation will first be described with reference to FIG. 12.

Figure 12:
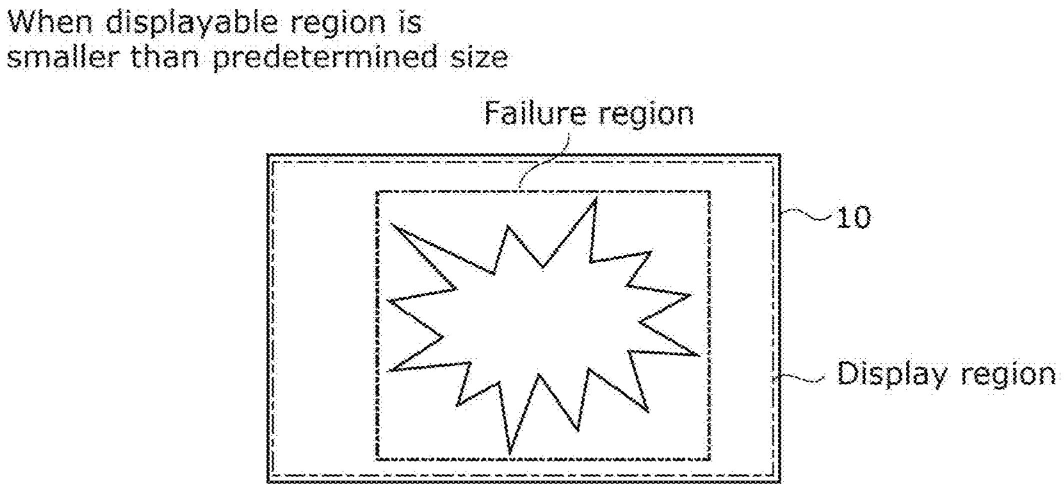
FIG. 12 is a schematic diagram showing a case where the displayable region is smaller than a predetermined size.

FIG. 12 is a schematic diagram showing a case where a displayable region is smaller than a predetermined size.

In the present variation, when the displayable region is smaller than the predetermined size, display range manager 31 may output failure information indicating that display screen 10 fails. The case where the displayable region is smaller than the predetermined size is a case where the ratio of the length of the displayable region in a vertical direction to the length of the displayable region in a horizontal direction is less than a predetermined value or a case where the number of pixels of the displayable region in the vertical direction or the number of pixels of the displayable region in the horizontal direction is less than a predetermined value. For example, when the displayable region is smaller than the predetermined size, since the displayable region is small, or is distorted by being stretched horizontally or vertically, it is likely that the user has difficulty in viewing an image which is displayed, or the user cannot recognize important information. Hence, when the displayable region is smaller than the predetermined size, display range manager 31 may output the failure information to provide notification to units therearound.

In the variation as described above, a processing operation when the displayable region is smaller than the predetermined size will be described with reference to FIG. 13.

Figure 13:
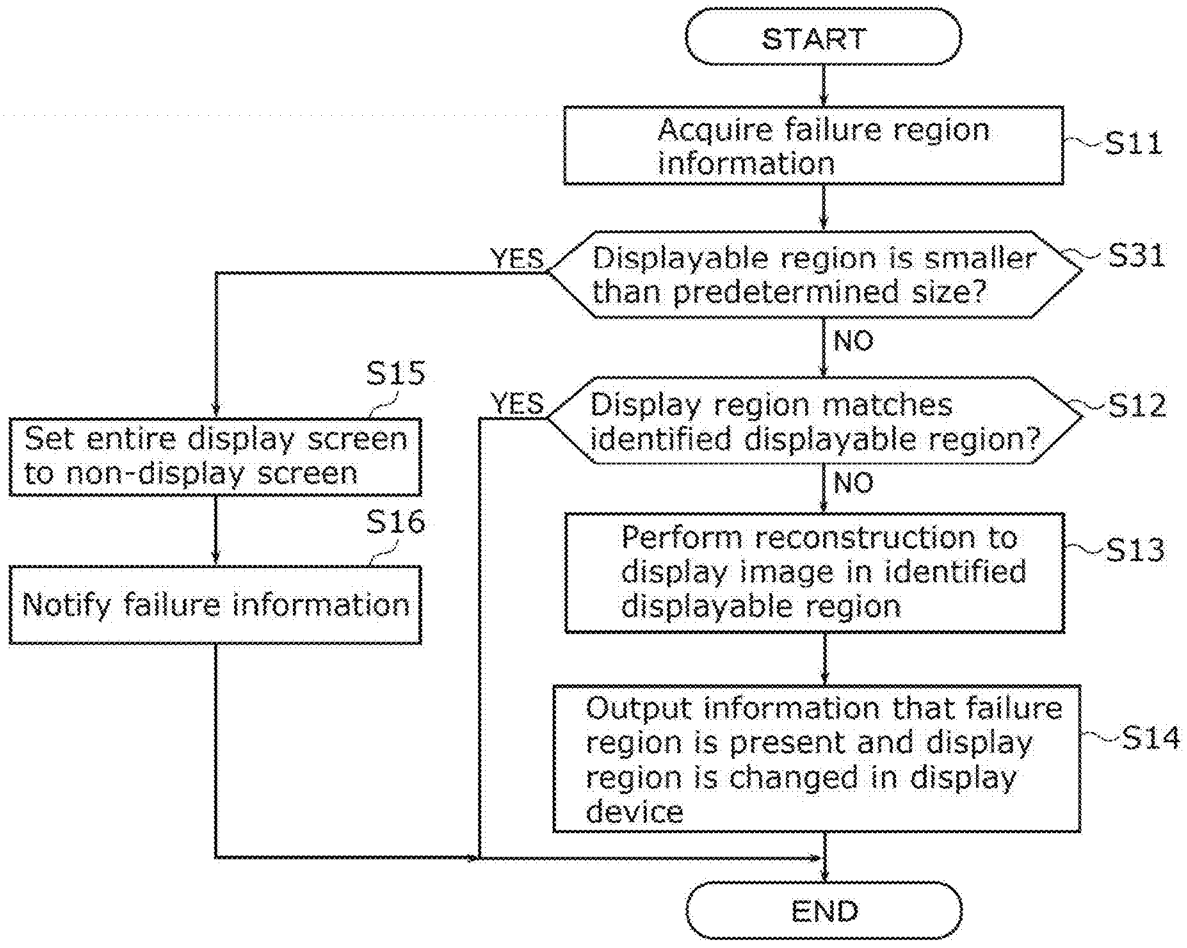
FIG. 13 is a flowchart showing the processing operation of a display system in Variation 2 of the embodiment.

FIG. 13 is a flowchart showing the processing operation of display system 1 in Variation 2 of the embodiment.

First, after step S11 is performed, display range manager 31 determines whether the displayable region is smaller than the predetermined size (S31).

When display range manager 31 determines that the displayable region is smaller than the predetermined size (yes in S31), display range manager 31 sets entire display screen 10 to a non-display screen (S15). Display range manager 31 outputs the failure information to notifier 40. In this way, notifier 40 notifies the failure information (S16), and thus the user can take a measure such as repairing or replacing display device 9.

Then, the processing operation in the flowchart shown in FIG. 13 is completed, and the processing returns to step S11 to repeat the operation processing.

On the other hand, when display range manager 31 determines that the displayable region is not smaller than the predetermined size (no in S31), display range manager 31 performs steps S12 to S14, and then completes the processing operation in the flowchart shown in FIG. 13. Then, the processing returns to step S11 to repeat the operation processing.

In step S13 shown in FIG. 13 in the present variation, display range manager 31 may further reconstruct the identified displayable region while maintaining the aspect ratio.

In step S13 shown in FIG. 13 in the present variation, display range manager 31 may identify, based on the failure region information acquired from acquirer 21, the displayable region obtained by omitting only the failure region from the display region, and reconstruct all the display regions other than the failure region as one displayable region.

In display control device 20 according to the present variation as described above, when the displayable region is smaller than the predetermined size, controller 30 outputs the failure information indicating that display screen 10 fails.

In this way, when the displayable region is smaller than the predetermined size, since the displayable region is excessively small, or the displayable region is distorted by being stretched horizontally or vertically, the user has difficulty in viewing the image. Hence, the failure information is output, and thus it is possible to cause the user to consider replacement or repair.

Other Variations

Although the display control device, the display control method and the programs in the present disclosure have been described above based on the above embodiment, the present disclosure is not limited to the embodiment described above. Embodiments obtained by performing various types of variations conceived by the person skilled in the art may be included in the scope of the present disclosure as long as they do not depart from the spirit of the present disclosure.

For example, the controller and the like included in the display control device, the display control method, and the programs in the embodiment described above are typically realized as an LSI circuit which is an integrated circuit. Each of them may be integrated into one chip or they may be integrated into one chip so as to include a part or all of them.

The integration is not limited to LSI, and may be realized by a dedicated circuit or a general-purpose processor. A field programmable gate array (FPGA) which can be programmed after the manufacturing of an LSI circuit or a reconfigurable processor in which the connection and setting of circuit cells inside an LSI circuit can be reconfigured may be utilized.

Constituent elements in the embodiment described above may be formed with dedicated hardware or may be realized by executing software programs suitable for the constituent elements. A program executer such as a CPU or a processor may read and execute software programs recorded in a recording medium such as a hard disk or a semiconductor memory to realize the constituent elements.

All the numbers used in the above description are used as examples for specifically describing the present disclosure, and the embodiment of the present disclosure is not limited to the numbers which are used as examples.

The division of functional blocks in the block diagram is an example, and a plurality of functional blocks may be realized as one functional block, one functional block may be divided into a plurality of blocks, or a part of functions may be transferred to another functional block. The functions of a plurality of functional blocks which have similar functions may be processed by a single hardware or software unit in parallel or in a time division manner.

The order in which the steps in the flowchart are performed is used as an example for specifically describing the present disclosure, and an order other than the order described above may be adopted. A part pf the steps described above may be performed at the same time (in parallel) with another step.

The features of the display control device, the display control method, and the programs described based on the above embodiment will be described below.

Technique 1

A display control device includes: an acquirer that acquires failure region information indicating a failure region in a display region constructed on one or more display screens that display an image; and a controller that: identifies, based on the failure region information acquired by the acquirer, a displayable region obtained by omitting the failure region from the display region; reconstructs the displayable region to display the image in the displayable region identified; and outputs the displayable region reconstructed.

Technique 2

In the display control device described in technique 1, the controller: divides the displayable region identified into a plurality of displayable regions; subjects the plurality of displayable regions to the reconstructing; and outputs the plurality of displayable regions obtained by being divided and reconstructed.

Technique 3

In the display control device described in technique 1, when a first display screen and a second display screen among the one or more display screens are arranged, the controller: identifies a first displayable region obtained by omitting the failure region from a first display region on the first display screen and a second displayable region obtained by omitting the failure region from a second display region on the second display screen; performs the reconstructing to display the image in the first displayable region and the second displayable region that have been identified; and outputs the first displayable region and the second displayable region that have been subjected to the reconstructing.

Technique 4

In the display control device described in technique 1, when a first display screen and a second display screen among the one or more display screens are arranged, the controller: identifies one displayable region obtained by omitting the failure region from one display region that is a combination of a first display region on the first display screen and a second display region on the second display screen; performs the reconstructing to display the image in the one displayable region identified; and outputs the one displayable region subjected to the reconstructing.

Technique 5

In the display control device described in any one of techniques 1 to 4, the controller subjects the displayable region identified to the reconstructing while maintaining an aspect ratio before the reconstructing.

Technique 6

In the display control device described in any one of techniques 1 to 5, when a first display screen and a second display screen among the one or more display screens are arranged, the controller: identifies, based on the failure region information of the first display screen, a first displayable region obtained by omitting the failure region from a first display region on the first display screen; divides the first display region into the first displayable region and the failure region; performs the reconstructing; outputs, from the first display screen, an image corresponding to the first displayable region subjected to the reconstructing; and outputs, from a second display region on the second display screen subjected to the reconstructing, an image corresponding to the failure region.

Technique 7

In the display control device described in any one of techniques 1 to 6, the controller identifies, based on the failure region information acquired by the acquirer, the displayable region obtained by omitting only the failure region from the display region.

Technique 8

In the display control device described in any one of techniques 1 to 7, when the failure region indicated by the failure region information acquired by the acquirer occupies a predetermined percentage or more of the display region, the controller outputs failure information indicating that the one or more display screens have failed.

Technique 9

In the display control device described in any one of techniques 1 to 8, when the displayable region is smaller than a predetermined size, the controller outputs failure information indicating that the one or more display screens have failed.

Technique 10

A display control method includes: acquiring failure region information indicating a failure region in a display region constructed on one or more display screens that display an image; identifying, based on the failure region information acquired, a displayable region obtained by omitting the failure region from the display region; reconstructing the displayable region to display the image in the displayable region identified; and outputting the displayable region reconstructed.

Technique 11

A non-transitory computer-readable storage medium having recorded thereon a program for causing a computer to execute: the display control method described in technique 10.

Embodiments obtained by performing, on the embodiment described above, various types of variations conceived by the person skilled in the art and embodiments realized by arbitrarily combining the constituent elements and functions in the embodiment described above without departing from the spirit of the present disclosure are also included in the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-105767 filed on Jun. 30, 2022, and PCT International Application No. PCT/JP2023/018855 filed on May 22, 2023.

INDUSTRIAL APPLICABILITY

The present disclosure can be utilized, for example, for vehicles and other devices and systems other than vehicles which install a plurality of display devices.

The invention claimed is:

1. A display control device comprising:

an acquirer circuit that acquires failure region information indicating a failure region in a display region constructed on one or more display screens that display an image; and a controller that:

identifies, based on the failure region information acquired by the acquirer circuit, a displayable region obtained by omitting the failure region from the display region;

reconstructs the displayable region to display the image in the displayable region identified; and outputs the displayable region reconstructed, wherein, when a first display screen and a second display screen among the one or more display screens are arranged side by side, the controller:

identifies a first displayable region obtained by omitting the failure region from a first display region on the first display screen, and a second displayable region obtained by omitting the failure region from a second display region on the second display screen;

performs the reconstructing to display the image in the first displayable region and the second displayable region that have been identified; and outputs the first displayable region and the second displayable region that have been subjected to the reconstructing, the first displayable region is a region reconstructed from a part of the first display region according to a size of the failure region on the second display screen, and the second displayable region is a region reconstructed by combining a remaining display region of the first display region and a displayable region obtained by omitting the failure region from the second display region, and the controller outputs the reconstructed second displayable region such that the image is displayed to straddle the first display screen and the second display screen.

2. The display control device according to claim 1, wherein the controller:

divides the displayable region identified into a plurality of displayable regions;

subjects the plurality of displayable regions to the reconstructing; and outputs the plurality of displayable regions obtained by being divided and reconstructed.

3. The display control device according to claim 1, wherein the controller subjects the displayable region identified to the reconstructing while maintaining an aspect ratio before the reconstructing.

4. The display control device according to claim 1, wherein when the first display screen and the second display screen among the one or more display screens are arranged, the controller:

divides the first display region into the first displayable region and the failure region;

performs the reconstructing;

outputs, from the first display screen, an image corresponding to the first displayable region subjected to the reconstructing; and outputs, from the second display region on the second display screen subjected to the reconstructing, an image corresponding to the failure region.

5. The display control device according to claim 1, wherein the controller identifies, based on the failure region information acquired by the acquirer circuit, the displayable region obtained by omitting only the failure region from the display region.

6. The display control device according to claim 1, wherein when the failure region indicated by the failure region information acquired by the acquirer circuit occupies a predetermined percentage or more of the display region, the controller outputs failure information indicating that the one or more display screens have failed.

7. The display control device according to claim 1, wherein when the displayable region is smaller than a predetermined size, the controller outputs failure information indicating that the one or more display screens have failed.

8. A display control method comprising:

acquiring failure region information indicating a failure region in a display region constructed on one or more display screens that display an image;

identifying, based on the failure region information acquired, a displayable region obtained by omitting the failure region from the display region;

reconstructing the displayable region to display the image in the displayable region identified; and outputting the displayable region reconstructed, wherein when a first display screen and a second display screen among the one or more display screens are arranged side by side, the method further comprises:

identifying a first displayable region obtained by omitting the failure region from a first display region on the first display screen, and a second displayable region obtained by omitting the failure region from a second display region on the second display screen;

performing the reconstructing to display the image in the first displayable region and the second displayable region that have been identified; and outputting the first displayable region and the second displayable region that have been subjected to the reconstructing, the first displayable region is a region reconstructed from a part of the first display region according to a size of the failure region on the second display screen, and the second displayable region is a region reconstructed by combining a remaining display region of the first display region and a displayable region obtained by omitting the failure region from the second display region, and the reconstructed second displayable region is output such that the image is displayed to straddle the first display screen and the second display screen.

9. A non-transitory computer-readable storage medium having recorded thereon a program for causing a computer to execute:

the display control method according to claim 8.

* * * * *